United States Patent [19]

Schlossman et al.

[11] 4,165,303

[45] Aug. 21, 1979

[54] POLYMER COMPOSITIONS CONTAINING POLY (ALKYLENE ETHER) ESTERS OF POLYBASIC ACIDS

[75] Inventors: Irwin S. Schlossman, Cincinnati, Ohio; Robert E. Wiman, Marietta, Ga.

[73] Assignee: Emery Industries, Inc., Cincinnati, Ohio

[21] Appl. No.: 828,001

[22] Filed: Aug. 26, 1977

Related U.S. Application Data

[60] Continuation-in-part of Ser. No. 433,642, Jan. 16, 1974, abandoned, which is a division of Ser. No. 318,981, Dec. 27, 1972, abandoned, and a continuation-in-part of Ser. No. 183,266, Sep. 23, 1971, abandoned.

[51] Int. Cl.$^2$ .................. C08L 91/00; C08G 63/76
[52] U.S. Cl. .................. 260/22 D; 260/18 R; 260/18 N; 260/DIG. 17; 260/407; 260/DIG. 19; 260/DIG. 20; 525/425; 525/444; 525/437; 525/419
[58] Field of Search ................ 260/75 T, 78 S, 18 N, 260/22 D, DIG. 17, DIG. 19, DIG. 20; 528/273, 311, 333

[56] References Cited

U.S. PATENT DOCUMENTS

| | | | |
|---|---|---|---|
| 2,718,478 | 9/1955 | Fluck et al. | 260/78 S X |
| 2,842,462 | 7/1958 | Haas et al. | 260/78 S X |
| 3,388,104 | 6/1968 | Crovatt | 260/78 S |
| 3,575,856 | 4/1971 | Anton | 252/8.9 |
| 3,630,934 | 12/1971 | Kelly et al. | 252/547 |
| 3,637,580 | 1/1972 | Hattori et al. | 260/40 R |
| 3,652,713 | 3/1972 | Okazaki et al. | 260/DIG. 17 X |
| 3,655,821 | 4/1972 | Lofquist et al. | 260/DIG. 17 X |
| 3,666,731 | 5/1972 | Crovatt et al. | 260/78 S |
| 3,694,257 | 9/1972 | Dumont | 252/8.9 X |

*Primary Examiner*—Walter C. Danison
*Attorney, Agent, or Firm*—Gerald A. Baracka

[57] ABSTRACT

Polyamides and polyesters having greatly improved resistance to static electricity buildup are obtained by the incorporation of about 0.1 to 20 weight percent poly(alkylene ether) esters of polybasic acid. The antistatic properties of these polymers is significantly improved when poly(ethylene oxide) esters of dimer and trimer acids are employed.

5 Claims, No Drawings

POLYMER COMPOSITIONS CONTAINING POLY (ALKYLENE ETHER) ESTERS OF POLYBASIC ACIDS

CROSS-REFERENCE TO RELATED APPLICATIONS

This is a continuation-in-part of copending application Ser. No. 433,642, filed Jan. 16, 1974 now abandoned, which was a division of abandoned application Ser. No. 318,981, filed Dec. 27, 1972 and a continuation-in-part of Ser. No. 183,266, filed Sept. 23, 1971, now abandoned.

BACKGROUND OF THE INVENTION

Polymeric materials such as polyolefins, polyamides, polyacrylonitriles and polyesters are susceptible to static electricity buildup due to their poor conductance. Electrostatic charges can develop during the processing of these materials, especially under conditions of low humidity, so that the charged fibers and filaments cling to mechanical parts, guides, etc., causing operational difficulties and damage to the fibers with the result that inferior fibers are obtained.

In order to facilitate the processing of polyester and polyamide filaments, the fibers are subjected to a surface treatment with one or more chemical finishing agents to minimize the static electricity buildup. Such surface treatments are only effective for short periods, however, and when the fibers are used in carpeting or for wearing apparel the static charge build-up can be annoying.

It would be highly advantageous and useful to have antistatic agents for use with polymeric materials which in addition to serving as processing aids during spinning and weaving also prevent the accumulation of electrical charges on the finished products during use, i.e., provide permanent antistatic protection. Such an antistat must necessarily have good compatibility with the polymeric material and be able to withstand repeated drycleanings and/or launderings.

In an effort to provide permanent antistatic protection for fibers and filaments, poly(alkylene ethers) have been blended with the polymers prior to melt-spinning. Ester-terminated poly(alkylene ethers) have been incorporated in polyolefins and polyesters, also. Ethoxylated triglycerides of hydroxystearic acid have also been suggested for use in polyamides to give rapid dissipation of electrostatic charges. None of these antistatic agents have been completely acceptable, however. Either the antistats are not resistant to repeated washing and drycleaning, they significantly decrease the antisoiling properties and/or dyeability of the polyester or they significantly reduce other important chemical or physical properties of the polymer.

SUMMARY OF THE INVENTION

It is an object of this invention to provide useful antistatic compositions for polyester and polyamide compositions which impart improved, essentially permanent, resistance to static electricity buildup without significantly affecting the other physical and chemical properties of the polymer. This and other objectives are realized by incorporating about 0.1 to about 20% by weight poly(alkylene ether) esters of polybasic acids with the polymeric material. More preferably about 1 to 15% by weight of the antistatic agent will be chemically incorporated in the polyamide or polyester by melt blending or during the polymerization. Dibasic acids or mixtures of dibasic and tribasic acids esterified with from about 1.4 to 2 mols poly(ethylene glycol) provide exceptional resistance to static charge buildup in polyesters and polyamides particularly when the molecular weight of the poly(ethylene glycol) ranges between about 400 to 6000 and the dibasic or tribasic acid is derived from a $C_{18}$ unsaturated fatty acid. The antistatic ester compositions of this invention are readily compatible with polyesters and polyamides and as a result of being partially or completely reacted into the polymer are essentially unaffected when the fabric is exposed to repeated washings or drycleanings. In addition to having permanent resistance to electrical charge buildup, the fabrics often have improved antisoiling properties and improved dyeability.

DETAILED DESCRIPTION

The antistatic agents of this invention are mixed esters of polybasic acids and poly(oxyalkylene) glycols and contain one or more radicals of the formula

where R' is hydrogen, a methyl or ethyl group and x indicates the number of repeating oxyalkylene units and ranges from about 4 to about 450. These radicals may be located internally or in a terminal position of the ester molecule, or both. The mixed ester compounds correspond to the general formula $$A\text{-}(C\text{-}B)_m \qquad (I)$$

where A represents a hydrocarbon radical containing from 24 to 64 carbon atoms, m is 2, 3 or 4 and B is hydroxyl, $-(OCHR'CH_2)_xOH$ or

where n is 1, 2 or 3, $B_1$ is a radical as defined for B and A, R' and x are the same as previously defined, with the proviso that at least one of the B groups is $-(OCHR'CH_2)_xOH$ or

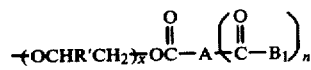

The hydrocarbon radical A may be branched, straight-chain or cyclic and, while essentially saturated, small amounts of ethylenic unsaturation may be present. Also, the number of valences of the hydrocarbon radical A will vary with the value of m, i.e. when m=2, A will be divalent and when m=3, A is trivalent. The molecular weights of the esters may vary widely depending primarily on the molecular weight of the poly(oxyalkylene) glycol employed and the extent to which the esterification reaction is driven.

In a preferred embodiment of this invention the polybasic acid is a dimer or trimer acid, or mixture thereof, and the poly(alkylene glycol) is a poly(ethylene glycol)

of molecular weight 200 to 10000. In terms of the designations already employed for formula I, these preferred compositions would have m=2 or 3, R'=hydrogen, x=about 4 to about 225, n=1 or 2 and A would be a bivalent or trivalent radical containing from 34 to 51 carbon atoms. In the case when dimer (dibasic) acid is employed the mixed ester products will have the general formula

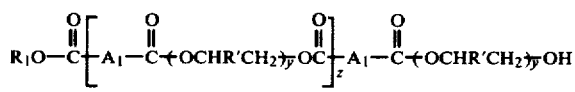

where $A_1$ represents a bivalent hydrocarbon radical, preferably containing 34 carbon atoms, z is an integer from 0 to about 3, $R_1$ is hydrogen or $-(CHR'CH_2O)_yH$, R' is hydrogen and y is a number from 4 to 225.

Especially useful ester compositions of this invention are derived from poly(ethylene glycols) of molecular weight 400 to 6000 and dimer acids containing 36 carbon atoms, said poly (ethylene glycol) and dimer acid being reacted at a molar ratio of 1.4–2.0:1 employing conventional esterification procedures.

It is evident from the structural formulae that a variety of ester compositions encompassing both simple ester and polyester products are obtained with this invention. The compositions are generally mixtures containing several ester species, such as monoesters, diesters and condensation products thereof. The condensation products of this invention can be referred to as polyesters, however, the molecular weights of these polymers is well below the fiber-forming molecular weight range. When a specific ester product is mentioned in the invention it is not to be construed that this is the sole or even principal product present, but only that the average molecular weight of the ester composition substantially corresponds to this particular ester. The fact that a single ester product is not formed does not adversely affect the antistatic properties of these compositions, in fact, the enhanced antistatic activity of these compositions is believed to be related to the presence of a mixture of products and the ability of these ester products to react with the polymer being modified. Some unreacted starting materials may also be present in the ester products.

The amount of mixed ester product used with the polymer to impart antistatic protection may vary but generally will range between about 0.1% and 20% based on the weight of the polymer. It is generally preferred, however, with polyesters and polyamides that about 1% to about 15% by weight of the mixed ester be used. When employed in these ranges the antistatic compositions of the present invention are readily incorporated into the polyester or polyamide and significantly improved resistivity to static charge buildup is obtained.

The poly(alkylene ether) esters of polybasic acids are obtained employing standard esterification procedures. The molar ratio of the ether glycol to dibasic acid may range from about 2.5:1 to about 1.4:1, and more preferably from 1.4–2.0:1, but if trimer or tetramer acids are employed the ratio may be 5:1 or higher. The condensation of the polyoxyalkylene glycol with the dimer acid is conducted using conventional esterification techniques, that is, by heating the reaction mixture with or without a catalyst at a temperature from about 100° to 300° C. while removing the water of reaction. These reactions will more generally be conducted over the temperature range of 175° to 250° C. It is not necessary that a catalyst be employed to achieve esterification, however, conventional acid catalysts such as sulfuric acid, alkyl and arylsulfonic acids such as p-toluenesulfonic acid, phosphoric acid or the like may be employed. The amount of each reactant employed is in accordance with the molar ratios set forth above. To facilitate removal of water of reaction, particularly where the reaction mass is viscous and a low acid value is desired, a vacuum may be pulled on the system. The reaction will usually be terminated when the acid value of the reaction mixture reaches about 15 and preferably is 10 or below.

Polybasic acids useful for the preparation of the compounds of this invention may be obtained by any process known to the art but are most frequently obtained by the polymerization of monocarboxylic acids as described in U.S. Pat. Nos. 2,347,562; 2,793,219; 2,955,121 and 3,157,681. The dimer of polymer acids are obtained by the polymerization of monocarboyxlic acids containing ethylenic unsaturation. Monocarboxylic unsaturated acids to be polymerized generally contain about 16 to 26 carbon atoms and include, for example, oleic acid, linoleic acid, eleostearic acid and other singly or doubly unsaturated acids. To obtain dimer acids 2 mols of the unsaturated monocarboxylic acid are reacted, that is, dimerized. If the resulting dimer or polymer acid contains ethylenic unsaturation it may be hydrogenated prior to use. Trimer and tetramer acids may be present with the dimer acid and this mixture advantageously employed to obtain useful antistatic ester compositions. Commercially available compositions, sold under the trademark "Empol," which are mixtures of polymerized fatty acids having dimer and trimer acids as the major constituent may be advantageously employed. An especially useful dimer acid is the $C_{36}$ dibasic acid obtained by the dimerization of unsaturated $C_{18}$ fatty acids.

The poly(alkylene ethers), also referred to as poly(alkylene glycols), poly(oxyalkylene) glycols and poly(alkylene ether) glycols, useful for reaction with the polybasic acids have molecular weights ranging up to about 20000 but more typically from about 200 to about 10000. The poly(ethylene glycols) are available from commercial suppliers under the trade designations Carbowax and Polyox or they may be synthesized in the conventional manner. Poly(ethylene glycol) of 400 to 6000 molecular weight is especially useful for reaction with dimer and trimer acids. The molecular weights recited above are average molecular weights. An alternative to the direct esterification of the poly(alkylene glycol) and the dimer acid is to ethoxylate the dibasic acid with ethylene oxide, however, better control of molecular weight is possible employing the esterification technique.

While the antistatis ester products of this invention are useful with a wide variety of polymeric materials, they find their primary utility in polyesters and polyamides since, they can be readily incorporated therein to significantly improve the resistance to static electrical charge buildup of these materials. Polyesters for which the present compounds are useful include any of the condensation polymers obtained when one or more diols are reacted with one or more dibasic acids or suitable derivatives thereof, e.g. anhydrides. These antistatic agents are also useful with copolyesters and modified copolyesters. Glycols from which useful polyesters are obtained generally have the formula.

wherein a is an integer from about 2 to 10. Such glycols include ethylene glycol, 1,3-propanediol, 1,5-pentanediol, 1,6-hexanediol, 1,7-heptanediol, 1,8-octanediol, 1,9-nonanediol, 1,10-decanediol and the like.

Dicarboxylic acids typically employed include terephthalic acid, isophthalic acid, adipic acid, sebacic acid, succinic acid, oxalic acid, glutaric acid, pimelic acid, suberic acid, azelaic acid and the like. In addition to these more common diols and dicarboxylic acids other useful reactants might include glycerol, sorbitol, pentaerythritol, methoxypolyethylene glycol, neopentyl glycol monohydroxypivalate, trimethylol propane, trimesic acid, p,p'-dicarboxydiphenylmethane, p,p'-dicarboxydiphenoxyethane, p-carboxyphenoxyacetic acid, and the like. Especially useful polyesters for use with the antistatic compositions of the present invention, because of their commmercial availability and superior fiber forming characteristics, are poly(ethylene terephthalate) and poly(1,4-cyclohexylenedimethylene terephthalate).

The present poly(alkylene ether) ester compounds also provide excellent protection against static electrical charge buildup in polyamides formed by the reaction of dicarboxylic acids, such as described above for the preparation of polyesters, and a diamine or suitable derivative thereof. Diamines which may be employed have the general formula

wherein b is an integer from about 2 to 10, such as ethylenediamine, propylenediamine, tetramethylenediamine, pentamethylenediamine, hexamethylenediamine, decamethylenediamine and the like. Nylon-6,6 which is obtained by the condensation polymerization of hexamethylenediamine and adipic acid is an especially useful polyamide for use with the present antistatic agents. Polyamides derived from the reaction of certain amino acids such as 6-aminocaproic acid, 7-aminoheptanoic acid, or the lactams of these acids, may also be treated in accordance with the present invention. Poly(caproamide), nylon-6, is an especially useful polyamide of this latter type. Nylon-6 is obtained from the condensation of caprolactam. Nylon-6 and nylon-6,6 are of special interest since they are widely used throughout the fiber industry for melt-spinning and in related operations and since the ester products of this invention are readily incorporated therein. Other polyamides, however, may also be used to advantage with the antistats of this invention and these include, for example, poly(tetramethylene adipamide), poly(pentamethylene adipamide), poly(heptamethylene adipamide), poly(heptamethylenepimelamide), poly(octamethylene adipamide), poly(decamethylene adipamide), poly(hexamethylene sebacamide), poly(pyrrolidone), poly(octamethylene oxalamide), poly(hexamethylene isophthalamide), poly(2-methyl-hexamethyleneteraphthalamide), and the like.

In general, the present antistatic agents may be employed with any polymeric material to obtain improved resistivity to static electrical charge buildup but by virtue of their chemical reactivity the poly(alkylene ether) ester compositions can be readily incorporated into polyesters and polyamides to provide permanent or essentially permanent antistatic properties. This incorporation is achieved by melt blending or by including the ester antistat in the final stages of the polymerization. Prior to melt blending, the antistats are combined with the polymeric material using conventional mixing equipment such as a Banbury mixer, revolving drum or sigma-blade mixer. They may be mixed into the polymer in dry form or can be dissolved or dispersed in a suitable solvent and the resulting solution employed. The solvents employed may be removed at an elevated temperature and/or under reduced pressure leaving a residue of the antistatic agent. The antistat compositions are then incorporated into the polymer by melt blending so that at least a portion of the antistat will be reacted with available functional groups of the polymer. In this manner the antistat, or at least a portion of it, is integrally bound within the polymer. The elevated temperatures at which the melt blending is carried out, usually in the range 215° to 295° C., is sufficient to bring about reaction of the available functional groups of the mixed ester antistat and the polymer.

The antistats are also incorporated into the polyester or polyamide by addition to the polymerization reaction. This latter aspect of the invention is readily achieved by adding the poly(ethylene glycol) ester directly to the polymerizer while the polymer is being formed, preferably during the final stages, or by reacting the ester with a suitable prepolymer. While the addition may be made to the polymer forming reactants at any stage of the polymerization or added incrementally or by proportioning throughout the course of the polymerization, the manner and mode of addition being governed by the relative reactivities of the reactants and the reaction conditions employed, it is generally advantageous to add the antistat after the molecular weight of the polymer is sufficient to develop the necessary physical properties of the polymer. Employing this technique, the antistat becomes an integral part of the polymer structure and consequently imparts superior and permanent antistatic properties to fabrics prepared from these fibers even after repeated washings and drycleanings.

The poly(alkylene ether) esters, incorporated either by melt-blending or polymerization, may be an integral part of the polymer backbone, pendant to the polymer backbone or a terminal grouping. When the compounds of the present invention are added with polyamide reactants the resulting polymer will be a polyamide-ester. Generally, the small amounts of the present antistatic agents as are required to impart effective antistatic protection, have little or no affect on the physical characteristics of the polymers.

The poly(alkylene ether) ester antistatic agent may be incorporated in the polyester or polyamide by itself or in combination with other corectants. Other compounding ingredients such as stabilizers, lubricants, plasticizers, etc., which are well-known to the art, can also be physically admixed therewith. It is sometimes advantageous to incorporate a high concentration of the antistatic agent into the polymeric material and to employ a portion of this masterbatch for subsequent preparations where lesser concentrations are desired.

The following examples illustrate the invention more fully, however, they are not intended as a limitation of the scope thereof. All parts and percentages in the examples are given on a weight basis unless otherwise indicated.

EXAMPLE I

A poly(ethylene glycol) ester of dimer acid was prepared by the reaction of 960 grams commercially available poly(ethylene glycol) having a molecular weight of about 1000 with 348 grams $C_{36}$ dibasic acid (Empol®1010). The molar ratio of these reactants was 1.6:1. The reaction was carried out at temperatures up to about 200° C. employing 0.2% acid catalyst until the theoretical amount of water (21.8 mls) was recovered. At this point the reaction product had an acid value of 8.8 (milligrams KOH per gram sample).

A copolyester of dimethyl terephthalate, ethylene glycol and the poly(ethylene glycol) dimerate was then prepared employing a modification of No. 68, *Preparative Methods of Polymer Chemistry*, Sorenson and Campbell, Second Edition (1968). The copolyester was prepared by reacting 40 grams bis 2-hydroxyethyl terephthalate obtained by the transesterification of ethylene glycol and dimethyl terephthalate and 0.8 grams of the poly(ethylene glycol) dimerate in the presence of 0.01 grams antimony trioxide and 0.1 grams calcium acetate. The copolyester contained 2.8% bound poly(ethylene glycol) dimerate. A similar preparation was conducted to obtain 5% bound poly(ethylene glycol) dimerate.

To determine the resistance of the polymers to static charge buildup and the effectiveness of the antistatic agents, polymer films were prepared and subjected to an ash test. The films were obtained by heating the granular polymer on a 3"×6" aluminum sheet until the polymer melted and then laying a second aluminum strip over the melt and compressing with a 1 kg weight. The melt was allowed to cool to room temperature and the film stripped from the aluminum sheets. The film was then rubbed (40 times in one direction) with a woolen pad and immediately placed over a plastic holder (¼" high and 1" diameter) containing a specified amount of cigar ash. After one minute, the amount of ash still clinging to each sample was determined. In all instances, the copolyesters containing the above-prepared ester composition at both the 2.8 and 5% levels were markedly superior to polyester containing no poly(ethylene glycol) dimerate. No appreciable difference was observed between the antistatic properties at the 2.8 and 5% levels.

When the poly(ethylene glycol) ester of dimer acid was melt-blended into poly(ethylene terephthalate) at a 2% level, similar improvement in the antistatic properties was observed over unmodified polyester.

EXAMPLE II

A series of poly(ethylene glycol) esters of various acids were prepared in accordance with the procedure described in Example I. The reactants, mol ratio of reactants and acid value for the resulting product are set forth in the table which follows:

| Sample Number | Poly(ethylene glycol) (M. W.) | Polybasic Acid | Molar Ratio (polyethylene glycol); polybasic Acid | Acid Value |
| --- | --- | --- | --- | --- |
| A | 400 | $C_{36}$ dibasic | 2:1 | 3.40 |
| B | 600 | $C_{36}$ dibasic | 2:1 | 5.90 |
| C | 1000 | $C_{36}$ dibasic | 2:1 | 6.40 |
| D | 1000 | $C_{36}$ dibasic | 1.6:1 | 8.80 |
| E | 1000 | 95% $C_{36}$ dibasic- | 2:1 | 4.0 |

-continued

| Sample Number | Poly(ethylene glycol) (M. W.) | Polybasic Acid | Molar Ratio (polyethylene glycol); polybasic Acid | Acid Value |
| --- | --- | --- | --- | --- |
| F | 1000 | 5% $C_{54}$ tribasic[1] 87% $C_{36}$ *dibasic*- 13% $C_{54}$ tribasic[2] | 2:1 | 3.60 |
| G | 1000 | 75% $C_{36}$ dibasic- 25% $C_{54}$ tribasic[3] | 1.6:1 | 17.4 |

[1]Empol® 1014 Dimer Acid
[2]Empol® 1016 Dimer Acid
[3]Empol® 1024 Dimer Acid

The various samples were melt-blended with poly(ethylene terephthalate) at a temperature of about 280° C. and the resulting modified resins evaluated for their antistatic properties. The particular test employed to determine the resistance to static charge buildup was a bleedoff test wherein a charge was applied and the length of time required to dissipate the charge recorded. Yarns were prepared from the poly(ethylene terephthalate) and immersed in an aqueous emulsion containing about 2% of the antistatic agent. A 4" section of the treated yarn was then stretched between two contacts and a 100 volt charge applied at one end by means of a static voltmeter. The time required for the voltage to decrease to 50 volts was recorded. Bleedoff times less than 30 seconds are considered good and less than 10 seconds excellent. Yarns containing Samples A–G all readily dissipated the static charge. For example, with Samples A, B, and C, bleedoff times of 14.6, 6.3 and 6.2 were obtained, respectively.

When the yarn samples were subjected to laundering with detergent, the percentage of loss of resistance to static charge buildup was greatly reduced compared to yarns containing known antistatic agents described in the prior art. In other words, the present antistats were more permanent than other closely related antistatic compounds.

EXAMPLE III

A mixed ester antistatic composition was prepared by reacting a tribasic acid and polyethylene glycol having an average molecular weight of 1000 at an equivalents ratio of 1:1.6, respectively. The tribasic acid (134.4 grams Empol®1041 trimer acid—a product of Emery Industries, Inc.) and 380 grams polyethylene glycol 1000 were charged to a reactor with 1.02 grams $H_3PO_2$ catalyst and heated for approximately 5½ hours while removing the water of reaction. The resulting ester product melted at about 80° C., had an acid value of 2.9 and a hydroxyl value of about 37.5 (milligrams KOH per gram of sample). Twelve-hundreths of a gram of the mixed ester product was blended with 2.88 grams nylon-6. A small amount of butanol was employed to facilitate addition of the antistatic additive and give more uniform blending. After evaporation of the butanol the ingredients were melt-blended at about 220° C. and the melt then formed into a film by pressing between two aluminum surfaces while allowing to cool. The film was stripped from the aluminum surface, rubbed 40 times with a wool cloth and placed over a cup containing cigar ash for one minute. No cigar ash was picked up by the nylon-6 film containing the antistatic additive at the 4% weight level. A similarly prepared and tested nylon-6 film containing no antistat attracted a large amount of the cigar ash.

EXAMPLE IV

An acid catalyzed condensation of $C_{36}$ dimer acid (0.06 mol) with 0.1 mol poly(ethylene glycol) having an average molecular weight of 6000 was carried out and the mixed ester reaction product evaluated as an antistatic additive for nylon-6,6 fiber. The reactants were heated for about 5 hours at a temperature of about 240° C. during which time about 4 mls of water was removed and then a vacuum of about 200 mm Hg was pulled on the system for an additional hour to remove the final traces of the water. The resulting mixed ester product was melt blended with nylon-6,6 at a 4% weight level and fibers prepared. Voltage decay tests conducted on yarns indicated a resistance of $5 \times 10^{13}$ ohms with the nylon/ester blend whereas a nylon-6 control yarn containing no antistatic additive had a resistance of $172 \times 10^{13}$ ohms. After 10 machine washings in a Frigidare model WS2 automatic washer using the prescribed wash setting and amount of detergent (Tide) the resistance value of the yarn containing the ester was $6.6 \times 10^{12}$ ohms, a slight improvement over the initial resistance value. The above results clearly demonstrate the ability of the ester compositions of this invention to function as antistatic agents and provide permanent antistatic protection even after numerous launderings.

We claim:

1. A fiber characterized by having improved and permanent antistatic properties consisting essentially of a polymer selected from the group consisting of nylon 6, nylon-6,6, poly(ethylene terephthalate) and poly(1,4-cyclohexylenedimethylene terephthalate) with about 0.1 to 20% by weight of a poly(alkylene ether) ester of a polybasic acid having the formula

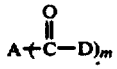

wherein A is a hydrocarbon radical containing from 34 to 51 carbon atoms, m is 2 or 3, and D is a radical selected from the group consisting of hydroxyl, $+OCHR'CH_2+_xOH$ or

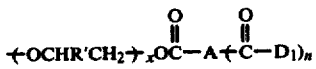

where R' is a hydrogen, a methyl or ethyl group, x is a number from about 4 to about 450, n is 1 or 2, $D_1$ is a radical as defined for D and A is a hydrocarbon radical as described above, provided that at least one of the D radicals is $+OCHR'CH_2+_xOH$ or

said poly(alkylene ether) ester being chemically incorporated into said polymer so that at least a portion of said ester is reacted into and bound to the polymer.

2. The fiber of claim 1 wherein the poly(alkylene ether) ester is obtained by reacting a poly(alkylene glycol) of molecular weight 400 to 6000 with a dimer acid containing 36 carbon atoms at a mol ratio of 1.4–2.0:1 to an acid value of 15 or below.

3. The fiber of claim 2 wherein the poly(alkylene ether) ester is present in an amount from 1 to about 15% by weight of the polymer.

4. The fiber of claim 3 wherein the poly(alkylene ether) ester is incorporated by melt-blending with the polymer.

5. The fiber of claim 3 wherein the poly(alkylene ether) ester is added to the polymerization reaction during the formation of the polymer.

* * * * *